(12) United States Patent
Migliorati

(10) Patent No.: US 12,348,173 B2
(45) Date of Patent: Jul. 1, 2025

(54) ECCENTRIC MASS VIBRATING SYSTEM

(71) Applicant: BARRA PROJECT INTERNATIONAL S.R.L., Nembro (IT)

(72) Inventor: Genio Fedele Migliorati, Bergamo (IT)

(73) Assignee: BARRA PROJECT INTERNATIONAL S.R.L., Nembro (IT)

( * ) Notice: Subject to any disclaimer, the term of this patent is extended or adjusted under 35 U.S.C. 154(b) by 190 days.

(21) Appl. No.: 17/971,885

(22) Filed: Oct. 24, 2022

(65) Prior Publication Data

US 2023/0136750 A1 May 4, 2023

(30) Foreign Application Priority Data

Oct. 28, 2021 (IT) .......................... 102021000027659

(51) Int. Cl.
*H02P 5/48* (2016.01)
*H02K 7/06* (2006.01)
(Continued)

(52) U.S. Cl.
CPC ............... *H02P 5/48* (2013.01); *H02K 7/063* (2013.01); *H02P 25/032* (2016.02)

(58) Field of Classification Search
CPC ......... H02P 5/48; H02P 25/032; H02K 7/063; B06B 1/162; B06B 1/166; B06B 1/161
(Continued)

(56) References Cited

U.S. PATENT DOCUMENTS

| 2015/0041242 A1* | 2/2015 | Meier | ................... G01V 1/153 |
| | | | 181/108 |
| 2019/0255571 A1* | 8/2019 | Kirsch | ................... B07B 1/284 |

(Continued)

FOREIGN PATENT DOCUMENTS

| GB | 2587023 A | * 3/2021 | ............. A47D 15/00 |
| TW | 201632273 A | * 9/2016 | |
| TW | 608874 B | 12/2017 | |

OTHER PUBLICATIONS

Nicholas Andrew et al. (GB 2587023 A).Portable Vibratable Sleep Enhancement Devic Date Published Mar. 17, 2021 (Year: 2021).*

(Continued)

*Primary Examiner* — Jorge L Carrasquillo
(74) *Attorney, Agent, or Firm* — Dickinson Wright PLLC; Andrew D. Dorisio

(57) ABSTRACT

An eccentric mass vibrating system comprising: a first motor having a first shaft; a first eccentric mass connected to said first shaft; a second motor having a second shaft; a second eccentric mass connected to said second shaft; said first motor and said second motor are adapted to be associated with an object to be vibrated; said first motor and said second motor being electrically adjustable so as to arrange said first eccentric mass and said second eccentric mass at a predefined angle therebetween; said first motor and said second motor being adapted to be positioned on an object to be vibrated; characterised in that it comprises: at least one sensor associated with said object to be vibrated, and a control computer of said system adapted to modify said predefined angle if the value measured by said sensor exceeds a predefined value.

11 Claims, 2 Drawing Sheets

(51) Int. Cl.
*H02P 25/032* (2016.01)
*H02P 25/32* (2006.01)
(58) Field of Classification Search
USPC .......................................................... 318/37
See application file for complete search history.

(56) References Cited

U.S. PATENT DOCUMENTS

2020/0408273 A1* 12/2020 Norris .................... F16F 7/1022
2021/0213479 A1*  7/2021 Grass ..................... A47G 19/24

OTHER PUBLICATIONS

Tang (CN 110112984 A) An Oscillation Control Method And Mobile Terminal Of Linear Motor (Year: 2019).*

* cited by examiner

ECCENTRIC MASS VIBRATING SYSTEM

This application claims priority to Italian Patent Application No. 102021000027659 filed on Oct. 28, 2021, the disclosure of which is incorporated herein by reference.

DESCRIPTION

The present invention refers to an eccentric mass vibrating system and a method for the control of an eccentric mass vibrating system.

TECHNICAL FIELD

The presence of residual tensions in structures made of electrowelded composite fabrication work is well-known in the metal working sector.

BACKGROUND

These tensions facilitate deformation of the structure during the various work phases and the formation of cracks when the structure is fatigue stressed. The many methods and processes useful for reducing residual tensions include heat treatment, ageing and vibrations.

In the use of vibrations, the stressed part is made to vibrate at different frequencies by means of a vibrator fixed to the part, and the acceleration pattern of the part is analysed as the frequencies induced by the vibrator vary.

The amplitude of the vibration depends on the vibration frequency and the energy transmitted by the vibrator. Namely, at given frequencies and energy transmitted, the vibration amplitude increases or decreases. The frequencies at which these increasing variations are noted are called resonance peaks. The part is therefore made to vibrate at different frequencies chosen from among those identified, for a variable time, until it has been stress-relieved.

Normally, rotating vibrators with shaft provided with eccentric mass are used, with the possibility of varying the energy delivered by the rotating eccentric mass. This unbalance can currently be manually mechanically adjusted, by varying the eccentric mass.

The unbalance of the vibrator must be chosen so as to be sufficient to bring to resonance the part undergoing the work process at the maximum energy it can absorb. Different treatment frequencies may require different amounts of energy.

This means that vibrators with different dimensions have to be adapted to specific individual cases in relation to the energy required by the application.

In other situations, the rotation frequency of the rotor driving the eccentric mass is reduced or increased, but variation only of the frequency may not solve the problem or may even be detrimental to the application.

Sizing of the eccentric mass, and therefore the energy that can be delivered by the vibrator, is also difficult and therefore vibrators that are oversized or undersized with respect to the actual requirements of the application tend to be used. Furthermore all the frequencies detected are treated with the same phase shift angle between the eccentric masses of the vibrator, and therefore with the same energy contribution even though, for the majority of the frequencies, the component being treated could absorb greater energy than that set by the operator for reasons of treatment feasibility.

If the operator has fixed a range of revolution numbers below the minimum established by the treatment cycle for reasons of feasibility, some of the component frequencies may not be detected during the analysis phase, due to incorrect choice of the vibrator or incorrect adjustment of the vibrator masses and number of revolutions by the operator.

Finding the optimal adjustment of the above parameters according to the components to be treated can be very complex since many variables have to be taken into account such as, for example, the noise level of the process; in fact a resonance frequency stimulated at an excessive energy level can propagate in the environment, through vibration of the component, deafening noise which is unbearable for the local operators. Noise is a polluting element for the environment and must therefore be brought within the permitted safety limits, but sound insulation of the intervention area is not always possible. This means that the operator has to reduce the vibration energy contribution to the component and therefore the phase shift value of the eccentric mass, reducing the effectiveness of the treatment.

Another variable is the current absorption of the motor. In the case of strong acceleration of the component at given frequencies, the vibrator absorption can increase exponentially, inducing overheating of the motor with possible stoppage of the work cycle.

Another variable is the movement of the component. Excessive vibration of the component can create instability in the component, causing it to shift from the work position.

All these factors make the initial adjustment by the operator very complex and entail long system set-up times.

The use of electric vibrators is not limited to eliminating residual tensions in metal, they are also used extensively in the sector of movement of loose materials, for example in hoppers, storage silos, load cells, etc.

For these types of applications where the mechanical vibrational energy is used to facilitate the extraction of stored materials, the same silo may contain materials with variable flow characteristics, possibly conditioned by external factors such as humidity, temperature, pressure, product type, etc.

One single vibrator with finite dimensions can provide a solution in the case of stoppage of the flow of a certain material in given conditions passing through the silo, but can worsen the situation if the conditions of the material vary, or if the materials passing through the silo have different characteristics from one another.

In these cases, the vibrations, not appropriately calibrated in terms of frequency and mass, can make the compaction levels worse or not guarantee regular flow of the material, compromising the extraction thereof.

Vibrations are also used in the screening sector, to select different granulometric dimensions of the screened materials, in conveyors to convey the material from one point to another, in vibrating extractors and in many other applications.

Also in these cases the same considerations apply as those made above: the material flows can vary and require frequencies and energies that can immediately adapt to the current work requirements.

SUMMARY

The object of the present invention is to provide an eccentric mass vibrating system which is more versatile than those of the known art.

A further object is to provide an eccentric mass vibrating system which is simple to produce.

In accordance with the present invention, said objects and others are achieved by an eccentric mass vibrating system comprising: a first motor having a first shaft; a first eccentric mass connected to said first shaft; a second motor having a second shaft; a second eccentric mass connected to said second shaft; said first motor and said second motor are adapted to be associated with an object to be vibrated; said first motor and said second motor being electrically adjustable so as to arrange said first eccentric mass and said second eccentric mass at a predefined angle therebetween; said first motor and said second motor being adapted to be placed on an object to be vibrated; characterised in that it comprises: at least one sensor associated with said object to be vibrated; a control computer of said system adapted to modify said predefined angle if the value measured by said sensor exceeds a predefined value.

Said objects and others are also achieved by a method for the control of an eccentric mass vibrating system having a first motor with a first eccentric mass and a second motor with a second eccentric mass;

comprising the steps of: positioning said system on the object to be vibrated; associating at least one sensor with the object to be vibrated; positioning said first eccentric mass and said second eccentric mass phase shift from each other by a first predefined angle; varying the speed of said first motor and said second motor between a first number of revolutions and a second number of revolutions; checking the value measured by said at least one sensor; varying said first predefined angle if the value measured by said at least one sensor exceeds a predefined value. Further characteristics of the invention are described in the dependent claims.

This solution has several advantages compared to the solutions of the known art.

Thanks to the present invention an eccentric mass vibrating system is obtained with the possibility of varying the energy delivered by two eccentric masses rotated by electric motors by modifying the deviation angle therebetween.

The automatically controlled eccentric mass vibrating system allows us to limit the vibrator range, optimise performance with a lower electrical energy consumption, facilitate sizing, minimise production stoppages, remote-control the work parameters semiautomatically or automatically, minimise the fatigue stress discharged onto the structures thereby reducing the risk of structural failure, etc.

Since variation of the vibrating mass by manual mechanical intervention is no longer necessary, risks to the safety of the personnel responsible for said intervention are minimised. Said interventions often have to be carried out in awkward positions and in sub-optimal environmental conditions.

The present system therefore offers significant advantages.

It is possible to eliminate the manual intervention of the operator for correct set-up and balancing of the system to carry out the treatment in an optimal manner.

It is possible to avoid having to treat all the frequencies with the same phase shift angle between the eccentric masses of the motor and therefore with the same energy contribution even though, for the majority of the frequencies, the component can absorb higher energy levels.

It is possible to reduce the application positions of the vibrator and the number of treatments necessary for complete stress relief of the structure.

It is possible to avoid the spread of noise pollution in the environment.

It is therefore possible to carry out the stress-relieving treatment always at the optimal condition for the component. It allows us to increase the effectiveness level of each individual treatment and reduce the number of treatments necessary to achieve complete stress relief.

To do this, the system involves the use of an automatically variable mass vibrator which, dialoguing with systems located in the field (sensors) and with a central control unit, automatically adapts the phase shift angle between the two masses to the specific working needs of each individual frequency of each specific component detected during the search cycle.

This means that the scanning phase can always search for the frequencies of the component throughout the standard frequency range. Each individual frequency identified is treated at the maximum level of energy that can be absorbed by the component being treated.

BRIEF DESCRIPTION OF THE DRAWINGS

The characteristics and the advantages of the present invention will be evident from the following detailed description of a practical embodiment thereof, illustrated by way of non-limiting example in the attached drawings, in which.

DETAILED DESCRIPTION

Figure 1:
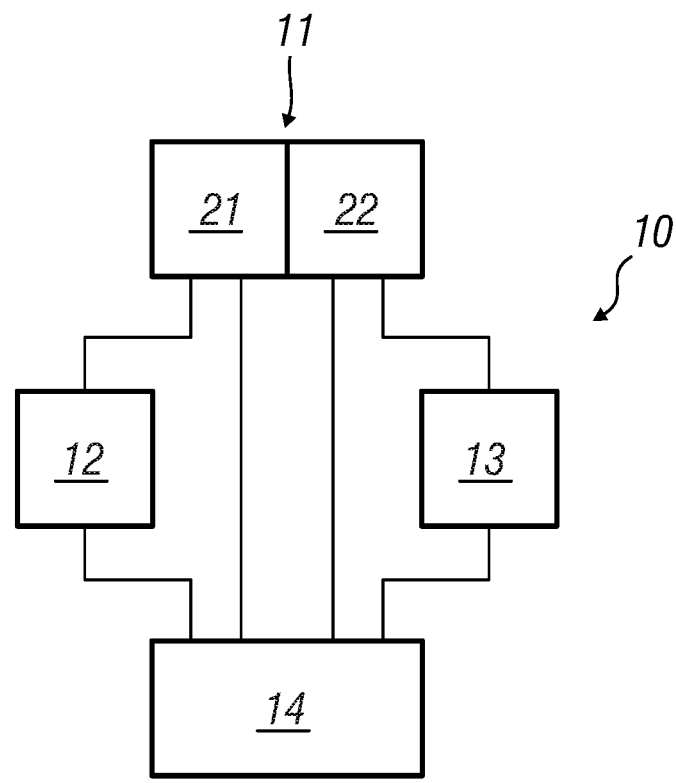
FIG. 1 shows schematically a block diagram of an eccentric mass vibrating system, in accordance with the present invention.
Figure 2:
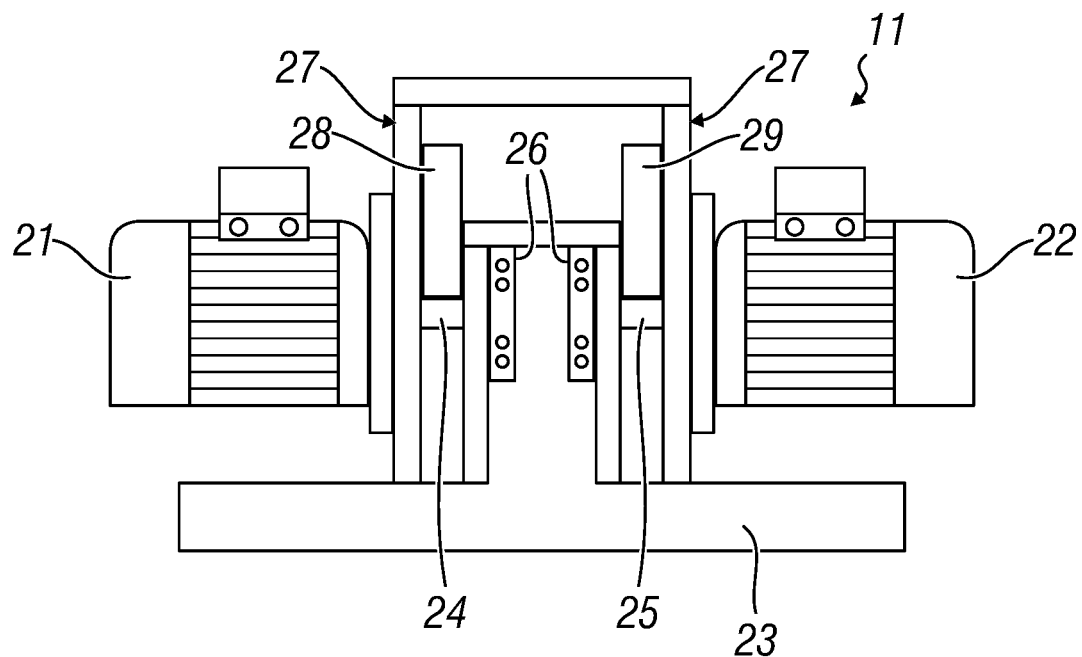
FIG. 2 shows schematically two motors with relative eccentric weights of an eccentric mass vibrating system, in accordance with the present invention.

Referring to the attached figures, an eccentric mass vibrating system 10, in accordance with the present invention, comprises a vibrator 11, a first drive circuit 12 of the vibrator 11, a second drive circuit 13 of the vibrator 11 and a control computer 14 of the eccentric mass vibrating system 10.

The vibrator 11 comprises a first electric motor 21 and a second electric motor 22, preferably stepper motors or brushless motors that allow precise quick movements with compact overall dimensions and great versatility.

The first electric motor 21 and the second electric motor 22 are fixed on a common base 23, which will be fixed to the object to be vibrated. The motors 21 and 22 are preferably positioned with the respective shafts 24, 25 opposite each other (but separate from each other) and preferably supported by two bearings 26 fixed on two structures 27 fixed perpendicularly on the common base 23, and joined to each other at the top to give the base 23 greater solidity.

Preferably, as shown in the figures, the shafts 24 and 25 are positioned on the same axis. But they can be opposite each other, adjacent or in different positions.

The motors 21 and 22 could be fixed to the base 23 also opposite each other with the respective shafts 24 and 25 facing outwards. The component to be vibrated, normally made of electrowelded composite fabrication work, can act as a base for direct fixing of the motors 21 and 22, without the use of the base 23.

On each shaft 24 and 25, a respective bar 28 and 29 is positioned to form the eccentric mass.

The two bars 28 and 29 can have enlargements or expansions to reach the desired weight, and are equal in terms of dimension, form and weight.

The first drive circuit 12 drives the first electric motor 21, and the second drive circuit 13 drives the second electric motor 22, and the control computer 14 controls the drive circuits 12 and 13 and the whole of the eccentric mass vibrating system 10 which comprises various sensors for control of the vibrator 10, for example current sensors (ammeter) to detect the value of the current absorbed by the motors 21 and 22 and vibration sensors (accelerometers) which will be positioned on the object to be vibrated and will provide the feedback of the excitation applied, for example, by observing the amplitude of the vibrations as well as acoustic sensors (microphones) to be positioned in the vicinity of the object to be vibrated to monitor the value of the noise generated by the object to be vibrated, and frequency meters or spectrum analyzer.

The motors 21 and 22 are preferably stepper motors or brushless motors, with which it is possible to adjust, by means of the control computer 14, the phase of each of them, namely position the shaft 24 and 25, and consequently the bars 28 and 29, in the required position.

Figure 3:
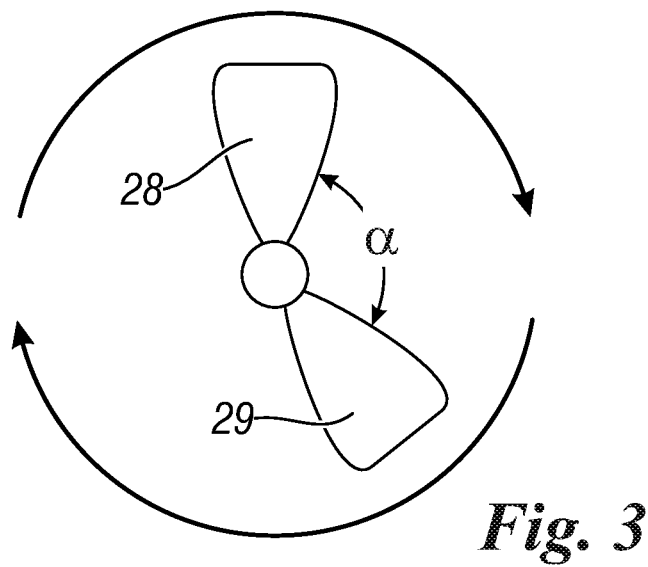
FIG. 3 shows schematically the eccentric weights of an eccentric mass vibrating system, in accordance with the present invention.

In this way it is possible to position, independently of each other, the bars 28 and 29 in every position from 0° to 360°. Consequently it is possible to position the bars 28 and 29 with an angle α as required, as shown in FIG. 3.

Figure 4:
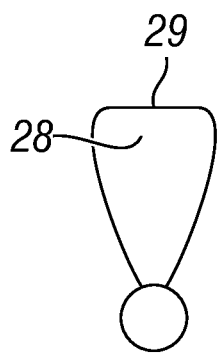
FIG. 4 shows schematically the eccentric weights in the position of maximum eccentricity, of an eccentric mass vibrating system, in accordance with the present invention.
Figure 5:
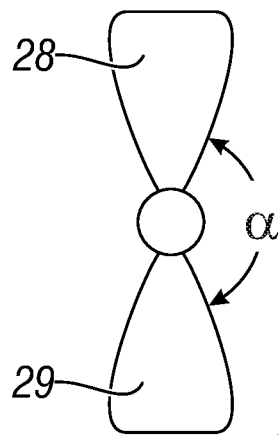
FIG. 5 shows schematically the eccentric weights in a neutral position, of an eccentric mass vibrating system, in accordance with the present invention.

It is therefore possible to choose an angle α between the two bars 28 and 29 from 0°, in the position of maximum eccentricity, as in FIG. 4, to an angle α between the two bars 28 and 29 at 180°, in position, as in FIG. 5.

Both the motors 21 and 22 can be adjustable, but to simplify the electronics, the phase of only one of the two motors is adjusted. In this case one motor is of the stepper or brushless type, therefore having adjustable phase, while the other can be an electric motor of any type.

Thanks to the present invention it is therefore possible to choose the amount of eccentricity, namely the unbalance, of the vibrator 10 automatically.

The procedure is carried out as follows.

The object to be vibrated is positioned on elastic load bearings, to isolate the object from the ground and vibrate it more easily.

The vibrator is positioned, oriented and locked securely on the object to be vibrated.

The vibration sensor is positioned on the part to be vibrated and/or the other sensors in the most appropriate positions.

The unbalance of the vibrator is adjusted, by adjusting the phase of at least one of the two motors 21 and 22, then the bars 28 and 29 are positioned with a predefined angle α between them. Initially the phase shift is maximum and equal to 180°.

The speed of the two motors 21 and 22 is varied within a predefined speed range, for example between 1500 and 6000 revolutions per minute, corresponding to vibrations of the part to be vibrated at different frequencies, at the maximum energy transmittable, maintaining fixed the predefined angle α between the bars 28 and 29.

The resonance or the resonances of the part to be vibrated are found.

In the case of a resonance in which the vibrations and/or the noise and/or the motor absorption is excessive and exceeds predefined preference values, the phase shift between the bars 28 and 29 is reduced, by means of the control computer 14, and in such a way as to reduce the excesses of the detected value to acceptable levels and the scan is repeated.

As soon as possible the phase shift between the bars 28 and 29 is increased again to avoid losing any resonance values.

At the end of the scan, the various resonance frequencies of the object to be vibrated have been obtained, corresponding to particular values of the motor revolutions, and the relative maximum phase shift angles between the bars 28 and 29 which allow treatment without excessive vibration, noise and absorption values.

The treatment cycle of the object to be vibrated is then started, in automatic mode, applying to the bars 28 and 29 the maximum phase shift values possible for each frequency to be treated.

The eccentric mass vibrating system with adjustment of the unbalance of the eccentric masses thus conceived is subject to numerous modifications and variations, all falling within the scope of the inventive concept; furthermore, all the details can be replaced by technically equivalent elements.

The invention claimed is:

1. An eccentric mass vibrating system comprising:
a first motor having a first shaft;
a first eccentric mass connected to said first shaft;
a second motor having a second shaft;
a second eccentric mass connected to said second shaft;
said first motor and said second motor are adapted to be associated with an object to be vibrated;
wherein:
said object to be vibrated is a structure made of electrowelded composite fabrication work;
said eccentric mass vibrating system is configured to reduce residual tensions in said object to be vibrated;
said first motor and said second motor being electrically adjustable so as to arrange said first eccentric mass and said second eccentric mass at a predefined angle therebetween;
said first motor and said second motor being adapted to be positioned on said object to be vibrated; and
said first motor and said second motor are made to rotate from a first speed to a second speed, wherein the speed of said first motor and said second motor is varied within a predefined range;
at least one sensor associated with said object to be vibrated, wherein said at least one sensor is an accelerometer or an ammeter or a microphone; and
a control computer of said system adapted to modify said predefined angle if the value measured by said at least one sensor exceeds a predefined value, wherein:
the control computer is adapted to reduce a phase shift between the first eccentric mass and the second eccentric mass in the case of a resonance in which vibrations, noise, or motor absorption is excessive and exceeds predefined reference values, and
the control computer is adapted to obtain resonance frequencies of the object to be vibrated corresponding to the speed of said first motor and said second motor, and relative maximum phase shift angles between the first eccentric mass and the second eccentric mass.

2. The system according to claim 1 wherein said at least one sensor is a sensor adapted to measure the vibrations of said object to be vibrated.

3. The system according to claim 1 wherein said at least one sensor is a sensor adapted to measure the noise generated by said object to be vibrated.

4. The system according to claim 1 wherein said at least one sensor is a sensor adapted to measure the current absorbed by said first motor.

5. The system according to claim 1 wherein said first eccentric mass and said second eccentric mass are equal in terms of dimension, form and weight.

6. The system according to claim 1 wherein said first motor is a stepper motor or a brushless motor.

7. The system according to claim 1 wherein said first motor and said second motor are fixed to a base; two structures are fixed perpendicularly on said base; and two bearings are fixed to said two structures fixed perpendicularly to support said first shaft and said second shaft respectively.

8. A method for the control of an eccentric mass vibrating system having a first motor with a first eccentric mass and a second motor with a second eccentric mass, the method comprising the steps of:
   positioning said system on an object to be vibrated, wherein the object to be vibrated is a structure made of electrowelded composite fabrication work, and the eccentric mass vibrating system is configured to reduce residual tensions in the object to be vibrated;
   associating at least one sensor with the object to be vibrated, wherein said at least one sensor is an accelerometer or an ammeter or a microphone;
   positioning said first eccentric mass and said second eccentric mass phase shift from each other by a first predefined angle;
   varying the speed of said first motor and said second motor between a first number of revolutions and a second number of revolutions, wherein the speed of said first motor and said second motor is varied within a predefined range;
   checking a value measured by said at least one sensor;
   varying said first predefined angle if the value measured by said at least one sensor exceeds a predefined value;
   reducing the phase shift between the first eccentric mass and the second eccentric mass in a case of a resonance in which vibrations, noise, or motor absorption is excessive and exceeds predefined reference values; and
   obtaining resonance frequencies of the object to be vibrated corresponding to the speed of said first motor and said second motor, and relative maximum phase shift angles between the first eccentric mass and the second eccentric mass.

9. The method according to claim 8 wherein after the steps of claim 8 the phase shift between the first eccentric mass and the second eccentric mass is increased again.

10. The method according to claim 8 further comprising:
    starting a treatment cycle of the object to be vibrated in an automatic mode;
    in response to the automatic mode, automatically applying to the first eccentric mass and the second eccentric mass maximum phase shift values for each vibration frequency to be treated.

11. An eccentric mass vibrating system comprising:
    a first motor having a first shaft;
    a first eccentric mass connected to said first shaft;
    a second motor having a second shaft;
    a second eccentric mass connected to said second shaft;
    said first motor and said second motor are adapted to be associated with an object to be vibrated;
    wherein:
    said object to be vibrated is a structure made of electrowelded composite fabrication work;
    said eccentric mass vibrating system is configured to reduce residual tensions in said object to be vibrated;
    said first motor and said second motor being electrically adjustable so as to arrange said first eccentric mass and said second eccentric mass at a predefined angle therebetween;
    said first motor and said second motor being adapted to be positioned on said object to be vibrated; and
    said first motor and said second motor are made to rotate from a first speed to a second speed, wherein the speed of said first motor and said second motor is varied within a predefined range;
    at least one sensor associated with said object to be vibrated, wherein said at least one sensor is an accelerometer or an ammeter or a microphone; and
    a control computer of said system adapted to modify said predefined angle if the value measured by said at least one sensor exceeds a predefined value, wherein:
    the control computer is adapted to reduce a phase shift between the first eccentric mass and the second eccentric mass in the case of a resonance in which vibrations, noise, or motor absorption is excessive and exceeds predefined reference values;
    the control computer is adapted to obtain resonance frequencies of the object to be vibrated corresponding to the speed of said first motor and said second motor, and relative maximum phase shift angles between the first eccentric mass and the second eccentric mass; and
    the object to be vibrated is adapted to start a treatment cycle in an automatic mode, wherein the treatment cycle comprises automatically applying maximum phase shift values for each vibration frequency to be treated to the first eccentric mass and the second eccentric mass.

* * * * *